June 1, 1937.   W. M. BRADSHAW   2,081,981

DETACHABLE POLYPHASE WATTHOUR METER

Filed Oct. 24, 1935   2 Sheets-Sheet 1

WITNESSES:

INVENTOR
William M. Bradshaw.
BY
ATTORNEY

June 1, 1937.　　　W. M. BRADSHAW　　　2,081,981
DETACHABLE POLYPHASE WATTHOUR METER
Filed Oct. 24, 1935　　　2 Sheets-Sheet 2
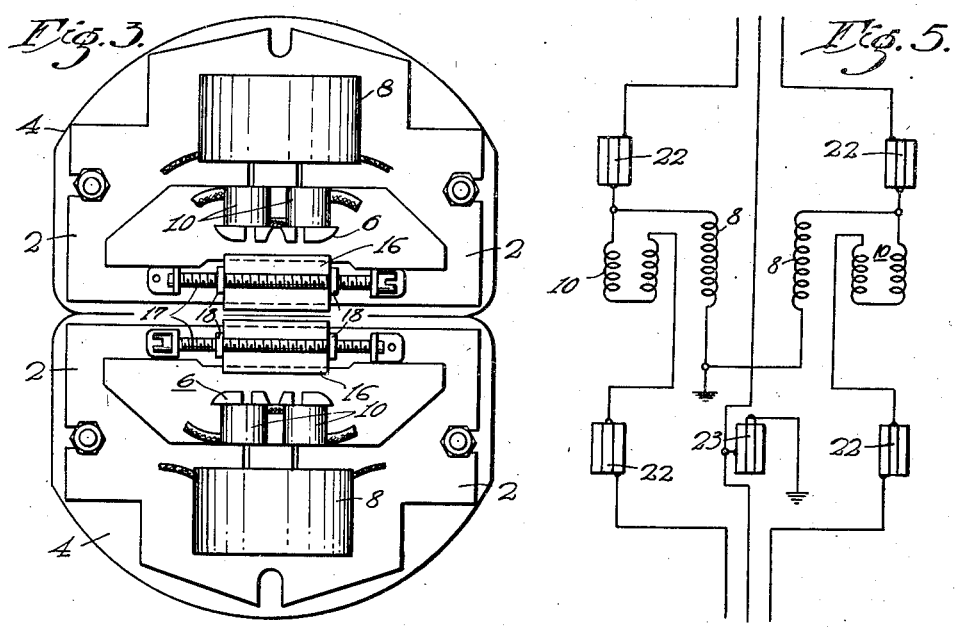
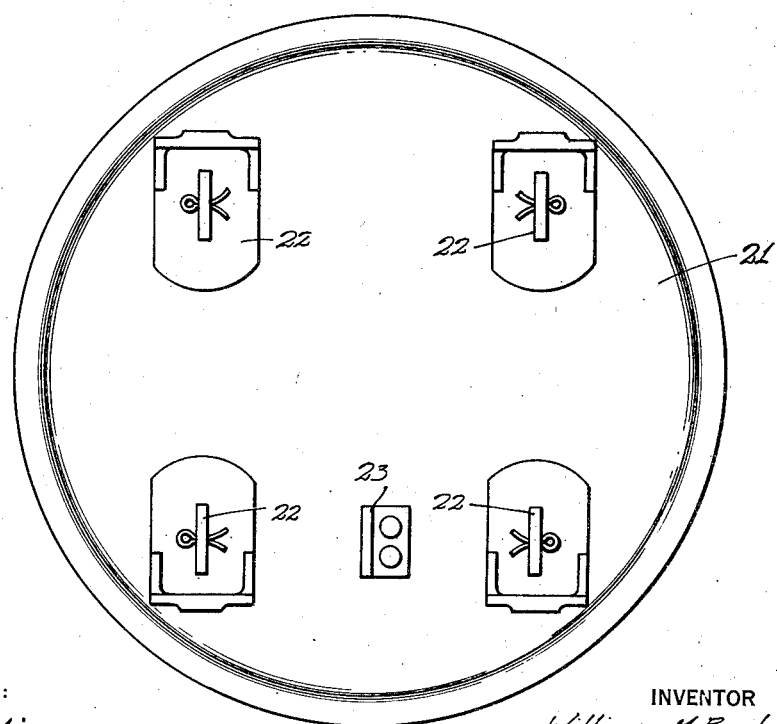
WITNESSES:
INVENTOR
William M. Bradshaw.
BY
ATTORNEY Patented June 1, 1937

2,081,981

UNITED STATES PATENT OFFICE 2,081,981

DETACHABLE POLYPHASE WATTHOUR METER

William M. Bradshaw, Summit, N. J., assignor to Westinghouse Electric & Manufacturing Company, East Pittsburgh, Pa., a corporation of Pennsylvania Application October 24, 1935, Serial No. 46,513

11 Claims. (Cl. 171—34)

The present invention relates to watthour meters of the so-called detachable type, and particularly to a polyphase meter element of such size and construction that it may be enclosed in the casing of an ordinary single-phase detachable watthour meter.

The use of the single-phase detachable watthour meter is quite widespread, such meters being of the character shown and described in U. S. Patent No. 1,969,499 issued August 7, 1934 to Bradshaw et al. Meters of this type comprise, briefly, an encased meter element having contact blades projecting from the base of the casing for insertion into contact jaws in a base receptacle or supporting structure, the jaws to be connected to the single-phase circuit to be metered.

The detachable mounting for meters has many recognized advantages over previous practice, and there has been a demand for a polyphase meter which may be mounted in a similar manner. Further, there is an obvious advantage in being able to use the same size and shape of base receptacle or support for both single-phase and polyphase meters, and, if at all possible, to be able to use the standard casing of a single-phase detachable meter to enclose a polyphase meter element.

It is an object of my invention, therefore, to provide a polyphase watthour meter element of such size and construction that it may be encased in the standard size of casing, and used with the standard size base receptacle or support now utilized for the mounting of single-phase detachable meters.

Referring to the accompanying drawings,

Fig. 3 is a view in elevation of the electromagnet structure employed in such meter;

Fig. 4 is a rear view of the structure shown in Fig. 2; and

Fig. 5 is a schematic wiring diagram of the circuits to and through the meter in accordance with the present invention.

Figure 1:
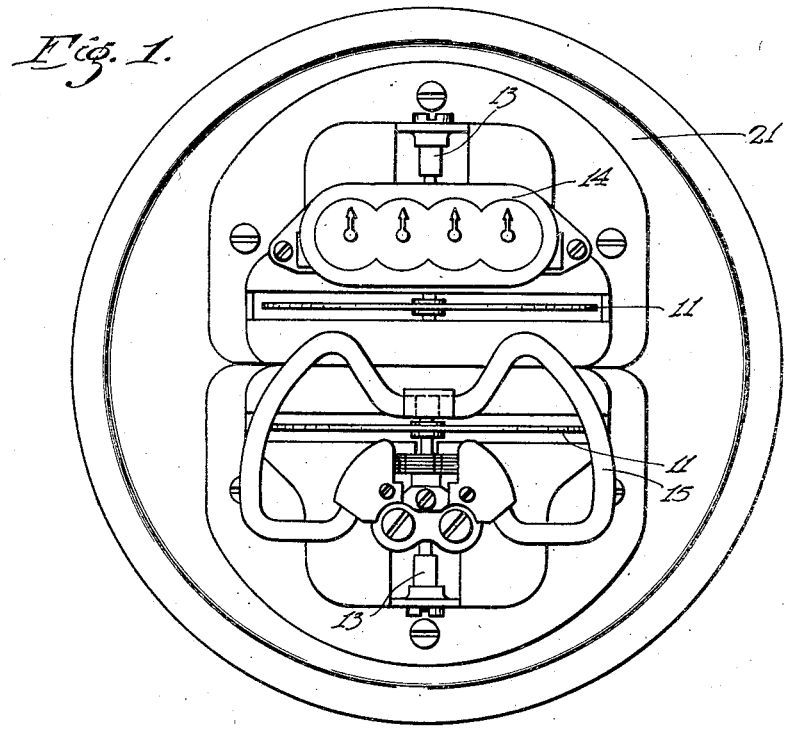
Figure 1 is a view in front elevation of a meter, with its cover removed, embodying the present invention.
Figure 2:
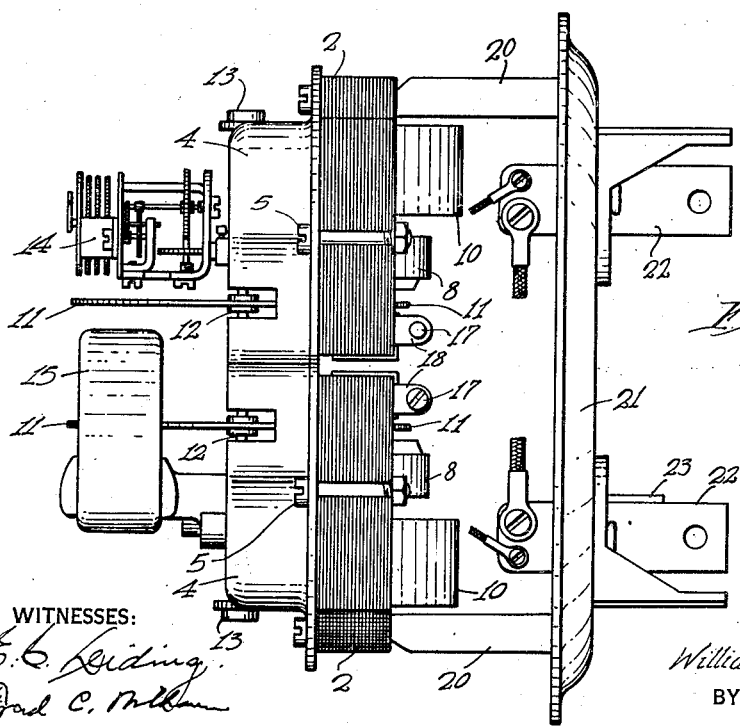
Fig. 2 is a view in side elevation of the meter shown in Fig. 1.

Referring more particularly to the drawings, one modification of the invention comprises a polyphase meter of the two-element type for use on a three-wire polyphase circuit.

Each of the meter elements comprises a standard single-phase electromagnet, with slight modifications as pointed out hereinafter, having a laminated core 2 secured to a supporting plate 4. Each electromagnet comprises pole portions 6 having a potential winding 8 and current windings 10 associated therewith. The pole portions terminate adjacent to the base of the lamination to define an air gap for receiving the meter disc 11. The plate 4 has a slot 12 registering with said air gap to permit the disc, which has an axis of rotation to one side of the plate 4 remote from the core 2, to extend through the plate into the air gap.

The type of single-phase electromagnet contemplated is that shown in Patent No. 1,691,354, issued November 13, 1928 to B. G. LaBar, and the supporting plate 4 is of the type shown in Patent No. 1,691,357, issued November 13, 1928 to W. G. Mylius. Referring to Fig. 3 of the last-mentioned patent, the supporting plate is provided with apertured brackets 20 for receiving upper and lower bearings for the armature shaft. In the present invention this plate is modified by removing the portion below the air-gap, including the lower bracket 20, to decrease the vertical dimension of the plate.

In the present invention, two elements as above described, are mounted in vertically aligned relation with the lower element inverted with respect to the upper; that is, the lower edges of the two plates 4 in abutting relation and a space, which may be of substantially zero width if desired, between the adjacent faces of the electromagnet cores 2. The abutting edges of the two plates 4 may be secured together by butt-welding, or otherwise, to constitute a rigid two-element meter movement, having two spaced bearings 13 for receiving the ends of the disc spindle, to which is secured the disc 11 of each element.

The upper plate 4 is provided with a removable integrating register 14 and the lower plate 4 is provided with a permanent magnet 15 which exerts a damping torque only on the lower disc. It should be appreciated that this magnet must be somewhat larger, or of greater magnetic strength, than the usual single-phase design because the damping torque exerted must be sufficient for both meter elements.

Each of the two electromagnets 2 is provided with a light-load adjusting device including a clip 16 of copper or the like, having a portion disposed in the air gap of the magnet and embracing three sides of the core structure. This construction is shown in the aforesaid Patent No. 1,691,354 to LaBar, except that in the present invention the actuating screw 17 and its supporting brackets 18 are disposed to one side of the magnet core, instead of beneath it as shown in said patent. The clip 16 may be moved along the laminated core, to vary its position with respect to the pole portions and hence vary the speed of the meter by the turning screw 17 in the proper direction.

With this construction of light-load adjuster the space between the two confronting edge faces of the electromagnets includes portions of the light-load adjusting clips which being of non-magnetic material assist in reducing phase interference between the two meter elements and hence improve the accuracy of the meter as a whole.

The possibility of interference between the two elements is further reduced by the use of electromagnets of the type shown, wherein the current and voltage windings are all on one side of the meter disc and the windings of each element are as remote as possible with respect to the windings on the other element. This also affords a more compact electromagnet design and is an important factor toward reducing the over-all dimensions of the assembly to permit it to be mounted in a standard single-phase casing.

Supporting posts or brackets 20 are suitably secured to the top and bottom of the plate assembly and are secured, in turn, to a substantially circular base plate 21 which is of the same size and shape now adopted as standard by meter manufacturers for detachable single-phase meters. A glass cover (not shown) provided with a peripheral metal flange for engaging the edge of the base 21 to complete the casing is intended, in accordance with standard practice. The plate 21 has extending therethrough a plurality of contact blades 22 electrically connected, on the meter side of the plate, to the windings of the two elements of the meter, in the manner indicated in Fig. 5. The construction of the base 21, the glass cover, and means for securing the contact blades 22 thereto is disclosed in the aforesaid Patent 1,969,499 to Bradshaw et al. and reference may be had thereto for a more complete description of such elements.

In the case of a polyphase meter, however, at least one additional contact 23 is necessary to constitute a common terminal for energizing the two potential windings. Such terminal may project through the base plate 21 at any convenient point and be secured thereto in a manner similar to that of the blades 22. In the present embodiment, however, it is disposed between the two lower blades 22 and may be directly secured to the base plate without insulation.

As shown in Fig. 5, the current windings of the upper and lower elements are connected respectively between the left and right hand pairs of contact blades 22, and each potential winding is connected between an upper blade 22 and a ground point within the meter element. The fifth blade being grounded because of its direct connection with the base plate 21, as shown, or by a connection within the casing if insulated therefrom, such potential windings are energized in accordance with the phase voltages, respectively.

It may be desirable, in some instances, to provide two additional blades 23 instead of a single one common to the two potential windings, but, in the interest of simplification, such provision is not shown in the present drawings. In either event, the only change necessary in the receptacle or support of the single-phase type is the provision of one or two additional contact jaws to receive the added contact blades. For example, in the receptacle shown in the aforesaid Patent 1,969,499 such additional jaws may be mounted on an insulating block extending between the two usual blocks, or they may be mounted upon the usual blocks, depending upon the position of the added contact blade or blades on the meter base plate 21.

These changes in the standard single-phase socket or support present no real problem because there is ample space for such addition. This is an important feature because it facilitates alteration of existing single-phase sockets or supports to receive polyphase meters in the event that a customer's single-phase service is changed to polyphase service, or vice versa, for the purpose of more efficient energy distribution.

In accordance with the present invention, the mounting of two single-phase elements as described results in an assembly which may readily be enclosed by the standard single-phase detachable meter casing, resulting in substantial economies in production, and avoiding the necessity of stocking separate casing and base designs for polyphase and single-phase meters.

Quite apparently, many modifications may be made in the construction shown and described, and it is desired that the invention shall be limited only by the prior art and the appended claims.

I claim as my invention:

1. In a polyphase watthour meter of the induction type, two single-phase meter elements each comprising a plate having a laminated core secured thereto provided with pole portions for the meter windings and an air-gap adjacent to one edge thereof for receiving a disc armature, means for mounting said elements in vertically aligned relation with said one edge of each core adjacent to the corresponding edge of the other core, a disc armature in each of said air-gaps, a common shaft for said armatures, an integrating register driven by said shaft, and a permanent magnet mounted to exert a damping force on only one of said armatures.

2. In a polyphase watthour meter of the induction type, two single-phase watthour meter elements each comprising an electromagnet having an air-gap for receiving a meter disc and a supporting plate therefor having a slot registering with said air-gap, a torque adjusting means for each electromagnet including a member of non-magnetic material extending over an edge of each electromagnet, but within the peripheral area of said plates, means for mounting said electromagnets in vertically aligned relation with said adjusting means disposed between the two electromagnets and the corresponding edges of said plates in abutting relation, a disc armature in each of said air-gaps and a common shaft for rotatably supporting them, and a permanent magnet mounted to exert a damping torque on only one of said discs.

3. In a polyphase watthour meter of the induction type, two single-phase watthour meter elements each comprising a supporting plate, an electromagnet mounted on said plate and having an air-gap for receiving a meter disc, and a torque adjusting means including a member of non-magnetic material extending over an edge face of the electromagnet, but within the peripheral area of said plate, means for mounting said meter elements in vertically aligned relation with said adjusting means disposed between the two electromagnets and the corresponding edges of said plates in abutting relation, a disc armature in each of said air-gaps and a common shaft for rotatably supporting them, a permanent magnet mounted to exert a damping torque on only one of said discs, said abutting edges of said two supporting plates being welded together, a base support, and means for securing remote points of the welded plates to said support.

4. In a polyphase watthour meter of the induction type, two single-phase watthour meter elements each comprising a supporting plate, an electromagnet mounted on said plate and having an air-gap for receiving a meter disc, and a torque adjusting means including a member of non-magnetic material extending over an edge of the electromagnet, but within the peripheral area of said plate, means for mounting said meter elements in vertically aligned relation with said adjusting means disposed between the two electromagnets and the corresponding edges of said plates in abutting relation, a disc armature in each of said air-gaps and a common shaft for rotatably supporting them, a permanent magnet mounted to exert a damping torque on one of said discs, said abutting edges of said two supporting plates being welded together, and means for securing remote points of the welded plates to a support, contact blades projecting through said support to the opposite side thereof, and electrical conductors from said electromagnets so connected to said blades as to complete the meter circuits.

5. In a polyphase watthour meter, a casing of standard size for enclosing a single-phase meter element and having contact blades projecting from the base of said casing to constitute a single-phase meter casing of the detachable type, two single-phase meter elements, each having current and potential windings, mounted in said casing in axially aligned relation with one of said elements inverted with respect to the other, a disc armature for each element, a common shaft for rotatably mounting said discs, electrical connections within the casing between the windings of said elements and said contact blades, and an additional contact blade connected within the casing to one terminal of each potential winding.

6. In a polyphase watthour meter, two single-phase meter elements each comprising an electromagnet having an air-gap for receiving a rotatable disc armature and current and potential windings thereon all disposed on the same side of said air-gap, a base support, means for mounting said two elements on said support in axially aligned substantially abutting relation with one element inverted with respect to the other, a disc armature for each element mounted on a common shaft, and a permanent magnet disposed to exert a damping torque on only one of said discs.

7. In a polyphase watthour meter, two single-phase meter elements each comprising an electromagnet having an air-gap for receiving a rotatable disc armature and current and potential windings thereon all disposed on the same side of said air-gap, a base support, means for mounting said two elements on said support in axially aligned substantially abutting relation with one element inverted with respect to the other, a disc armature for each element mounted on a common shaft, said discs being disposed between the groups of windings on the two elements.

8. In a polyphase watthour meter, two single-phase meter elements each comprising an electromagnet having an air-gap for receiving a rotatable disc armature and current and potential windings thereon all disposed on the same side of said air-gap, a base support, means for mounting said two elements on said support in axially aligned substantially abutting relation with one element inverted with respect to the other, a disc armature for each element mounted on a common shaft, said discs being disposed between the groups of windings on the two elements and at least five contact blade terminals secured to said base support for electrical connection to said winding to complete the metering circuit.

9. In a polyphase watthour meter, of the induction type, two single-phase electromagnets, each comprising an air gap for receiving a disc armature and current and potential windings on one side of said air gap, means for mounting said electromagnets with said air gaps adjacent to each other and separating the winding on one electromagnet from those on the other.

10. In a polyphase watthour meter, of the induction type, two single-phase electromagnets, each comprising an air gap for receiving a disc armature and current and potential windings on one side of said air gap, means for mounting said electromagnets with said air gaps adjacent to each other and separating the winding on one electromagnet from those on the other, a disc armature in each of said air gaps, a common shaft supporting said armatures, and a permanent magnet for exerting a damping torque on only one of said armatures.

11. In a polyphase watthour meter of the induction type, a pair of disc armatures, current and potential windings for association with each armature, means defining a magnetic flux path through said windings to establish a rotating field to actuate the respective armatures, and means for mounting said elements in such manner that said armatures separate the current and potential windings associated with one armature from the windings associated with the other armature.

WILLIAM M. BRADSHAW.